US011022381B2

(12) United States Patent
Barmeier

(10) Patent No.: US 11,022,381 B2
(45) Date of Patent: Jun. 1, 2021

(54) HEAT EXCHANGE SYSTEM WITH MAIN HEAT EXCHANGE CHAMBER AND SUBSIDIARY HEAT EXCHANGE CHAMBER AND METHOD FOR EXCHANGING HEAT BY USING THE HEAT EXCHANGE SYSTEM

(71) Applicant: Siemens Gamesa Renewable Energy A/S, Brande (DK)

(72) Inventor: Till Andreas Barmeier, Hamburg (DE)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 15/752,269

(22) PCT Filed: Sep. 28, 2016

(86) PCT No.: PCT/EP2016/073104
§ 371 (c)(1),
(2) Date: Feb. 13, 2018

(87) PCT Pub. No.: WO2017/055346
PCT Pub. Date: Apr. 6, 2017

(65) Prior Publication Data
US 2018/0238634 A1  Aug. 23, 2018

(30) Foreign Application Priority Data

Sep. 30, 2015 (EP) .................................... 15187735

(51) Int. Cl.
*F28D 20/00* (2006.01)
(52) U.S. Cl.
CPC .......... *F28D 20/0056* (2013.01); *Y02E 60/14* (2013.01)
(58) Field of Classification Search
CPC .... F28D 17/04; F28D 17/005; F28D 20/0056; F28D 2020/0013; F28D 2020/0069;
(Continued)

(56) References Cited

U.S. PATENT DOCUMENTS

2009/0090109 A1* 4/2009 Mills ................... F28D 20/0056
60/659
2013/0240171 A1* 9/2013 Morgan ................. F28D 20/00
165/10
(Continued)

FOREIGN PATENT DOCUMENTS

CN      103017349 A    4/2013
CN      203518746 U    4/2014
(Continued)

OTHER PUBLICATIONS

International Search Report/Written Opinion for PCT/EP2016/073104.
(Continued)

*Primary Examiner* — Travis C Ruby
(74) *Attorney, Agent, or Firm* — Schmeiser, Olsen & Watts LLP

(57) ABSTRACT

A heat exchange system with at least two heat exchange chambers is provided. Each of the heat exchange chambers includes heat exchange chamber boundaries which surround at least one heat exchange chamber interior of the heat exchange chamber. The heat exchange chamber boundaries include at least one first opening for guiding in of an inflow of at least one heat transfer fluid into the heat exchange chamber interior and at least one second opening for guiding out of an outflow of the heat transfer fluid out of the heat exchange chamber interior. At least one heat storage material is arranged in the heat exchange chamber interior such that a heat exchange flow of the heat transfer fluid through the heat exchange chamber interior causes a heat exchange between the heat storage material and the heat transfer fluid.

17 Claims, 14 Drawing Sheets

(58) Field of Classification Search
CPC ..... F28D 2020/0082; F28D 2020/0017; F28D 2020/0095; F28D 2020/0091; F28D 2020/0078; F28F 21/04; F28F 2270/00; F24H 7/0458; F24H 7/002; F24H 7/0483
See application file for complete search history.

(56) References Cited

U.S. PATENT DOCUMENTS

| | | | |
|---|---|---|---|
| 2014/0008033 A1* | 1/2014 | Howes | F28D 20/0056 165/10 |
| 2014/0014290 A1 | 1/2014 | Howes et al. | |

FOREIGN PATENT DOCUMENTS

| | | |
|---|---|---|
| CN | 103808178 A | 5/2014 |
| CN | 104566978 A | 4/2015 |
| EP | 0794395 A1 | 9/1997 |
| EP | 2703764 A2 | 3/2014 |
| WO | WO 2012020233 A2 | 2/2012 |
| WO | WO 2016150461 A1 | 9/2016 |

OTHER PUBLICATIONS

Non-English Chinese Office Action dated Mar. 27, 2019 for Application No. 20168007829.2.

* cited by examiner

HEAT EXCHANGE SYSTEM WITH MAIN HEAT EXCHANGE CHAMBER AND SUBSIDIARY HEAT EXCHANGE CHAMBER AND METHOD FOR EXCHANGING HEAT BY USING THE HEAT EXCHANGE SYSTEM

CROSS-REFERENCE TO RELATED APPLICATIONS

This application claims priority to PCT Application No. PCT/EP2016/073104, having a filing date of Sep. 28, 2016, based on European Application No. 15187735.4, having a filing date of Sep. 30, 2015, the entire contents both of which are hereby incorporated by reference.

FIELD OF TECHNOLOGY

The following refers to a heat exchange system with at least two heat exchange chambers and a method for exchanging heat by using the heat exchange system.

BACKGROUND

Despite the integration of renewable energy into the public electric energy system (power grid) a large share of electricity is nowadays still generated by fossil energy sources. But the global climate change requires the further development of renewable energies.

The energy output of renewable energy sources like wind and solar is not constant throughout a day or throughout a year. Consequently, electricity which is generated by utilizing energy from renewable energy sources fluctuates.

In order to manage this fluctuating electricity, heat (thermal energy) storage systems are developed for storing and releasing thermal energy (heat exchange system). Such a heat exchange system comprises a heat exchange chamber with heat exchange chamber boundaries which surround a heat exchange chamber interior. The heat exchange chamber interior is filled with heat storage material like stones. The heat exchange chamber boundaries comprise a first opening for guiding an inflow of a heat transfer fluid, e.g. air, into the heat exchange chamber interior and a second opening for guiding out an outflow of the heat transfer fluid out of the heat exchange chamber interior.

For a charging mode, the heat exchange system additionally comprises a charging unit for heating the heat transfer fluid with the aid of excess electricity. The resulting hot heat transfer fluid is infused into the heat exchange chamber interior via one of the openings (e.g. first opening) of the heat exchange chamber boundaries. This opening defines a "hot" terminal of the heat exchange chamber. The hot heat transfer fluid is guided through the heat exchange chamber interior. By the guiding of the hot heat transfer fluid through the heat exchange chamber interior a heat transfer from the heat transfer fluid to the heat storage material is caused. Heat is stored by the heat storage material.

Via the other opening (second opening) of the heat exchange chamber the resulting "cold" heat transfer fluid is guided out of the heat exchange chamber interior. Thereby, this opening of the heat exchange chamber boundaries defines a "cold" terminal (end) of the heat exchange chamber. The charging mode is stopped when the temperature at the cold terminal of the heat exchange chamber begins to rise above a predetermined temperature.

In a discharging mode of the heat exchange chamber this stored heat can be recovered: "cold" heat transfer fluid is infused into the heat exchange chamber interior via one of the openings of the heat exchange chamber boundaries. In this case, this opening defines a "cold" terminal. The cold heat transfer fluid is guided through the hot heat exchange chamber interior. By the guiding of the cold heat transfer fluid through the heat exchange chamber interior a heat transfer from the heat storage material to the heat transfer fluid is caused. Heat is released from the heat storage material.

Via the second opening of the heat exchange chamber boundaries the resulting "hot" heat transfer fluid is guided out of the heat exchange chamber interior. Thereby, the second opening of the heat exchange chamber defines a "hot" terminal of the heat exchange chamber.

The resulting hot heat transfer fluid can be used for generating steam with which a steam turbine is driven. A result of the described discharging mode: Heat is transformed back to electricity.

The discharging mode is stopped when the temperature at the cold terminal of the heat exchange storage begins to drop below a certain temperature.

A forecast of the amount of the energy output of renewable energy sources is pretty difficult. Hence, the providing of suitable heat exchange system is difficult, too.

SUMMARY

An aspect relates to a heat exchange system for flexibly storing (absorbing) energy and for flexibly releasing the stored (absorbed) energy.

A heat exchange system with at least two heat exchange chambers is provided, wherein each of the heat exchange chambers comprises heat exchange chamber boundaries which surround at least one heat exchange chamber interior of the heat exchange chamber. The heat exchange chamber boundaries comprise at least one first opening for guiding in of an inflow of at least one heat transfer fluid into the heat exchange chamber interior and at least one second opening for guiding out of an outflow of the heat transfer fluid out of the heat exchange chamber interior. At least one heat storage material is arranged in the heat exchange chamber interior such that a heat exchange flow of the heat transfer fluid through the heat exchange chamber interior causes a heat exchange between the heat storage material and the heat transfer fluid. The heat exchange chambers are arranged such that the inflow of the heat transfer fluid into the heat exchange chamber interior of one of the heat exchange chambers comprises the outflow of the heat transfer fluid out of the heat exchange chamber interior of the other heat exchange chamber. One of the heat exchange chambers is a main heat exchange chamber of the heat exchange system and one of the heat exchange chambers is a subsidiary heat exchange chamber. The subsidiary heat exchange chamber is preferably a small heat exchange chamber in comparison to the main heat exchange chamber. A heat capacity of the small heat exchange chamber is lower that a heat capacity of the main heat exchange chamber.

The heat exchange chamber interiors can be connected together in parallel. Preferably, the heat exchange chamber interiors of the heat exchange chambers are serially connected together.

In addition to the heat exchange system, a method for exchanging heat by using the heat exchange system is provided, wherein the outflow of the heat transfer fluid out of the heat exchange chamber interior of one of the heat exchange chambers is guided as inflow of the heat transfer fluid into the heat exchange chamber interior of the other heat exchange chamber.

A heat exchange chamber is a space, cavity or a housing in which the heat storage material is located. Inside of the heat exchange chamber the heat exchange takes place. In order to provide an efficient heat exchange, the heat exchange chamber is preferably thermally insulated against the surroundings. The loss of heat is reduced by the thermal insulation.

The heat transfer fluid is guided (led) into the heat exchange chamber interior via the first opening and is guided out of the heat exchange chamber interior via the second opening. The first opening of the heat exchange chamber boundaries is an inlet opening. The second opening of the heat exchange chamber boundaries is an outlet opening. Thus, there are different areas of the heat exchange chamber boundaries, namely an inlet area of the heat exchange chamber boundaries with the first opening and an outlet area of the heat exchange chamber boundaries with the second opening.

The operating mode of the heat exchange system is selected from the group consisting of charging mode with a heat transfer from the heat transfer fluid to the heat storage material and discharging mode with a heat transfer from the heat storage material to the heat transfer fluid.

Preferably, during the charging mode of the heat exchange system the heat exchange flow is directed in a charging mode direction through the heat exchange chamber interior of at least one of the heat exchange chambers; during a discharging mode the heat exchange flow is directed in a discharging mode direction through the heat exchange chamber interior of at least one of the heat exchange chambers; and the charging mode direction and the discharging mode direction are opposed to each other.

Depending on the operating mode, a specific opening can have the function of an inlet opening or the function of an outlet opening. The flow direction of the heat exchange flow depends on the operating mode. Preferably, during the charging mode the heat exchange flow is directed in a charging mode direction, during the discharging mode the heat exchange flow is directed in a discharging mode direction and the charging mode direction and the discharging mode direction are opposed to each other (countercurrent operation). But, a change of the directions of the heat exchange flow is not necessary. Charging mode direction and discharging mode direction comprise the same direction (co-current operation).

In countercurrent operation, switching from the charging mode to the discharging mode the direction of the heat exchange flow through the heat exchange chamber interior is reversed and consequently, the function of the openings (inlet opening, outlet opening) is reversed, too. With such a solution it is especially advantageous to use the same heat transfer fluid for the charging mode and for the discharging mode. But of course, different heat transfer fluids for the charging mode and the discharging mode can be used, too.

For the charging mode, the heat exchange system is equipped with at least one charging unit for heating the heat transfer fluid. In the charging mode with activated charging unit, the charging unit can be located upstream of the heat exchange chamber. In contrast to that, in the discharging mode with a deactivated charging unit, the charging unit can be located downstream of the heat exchange chamber.

Preferably, the charging unit comprises at least one electrical heating device which is selected from the group consisting of resistance heater, inductive heater, emitter of electromagnetic radiation and heat pump. The electromagnetic radiation is preferably infrared radiation. A combination of different electrical heating devices is possible. With the aid of the electrical heating devices electricity is transformed into heat. This heat is absorbed by the heat transfer fluid and transported to the heat storage material in the heat exchange chamber interior.

For instance, the electrical heating device comprises a resistance heater. This heater is located in the heat exchange inflow upstream of the heat exchange chamber. The heat transfer fluid is heated up before entering of the heat exchange chamber interior. The resistance heater comprises a large heat exchange area for an efficient heat exchange from the resistance heater to the heat transfer fluid. For instance, the large heat exchange area is formed by a grid of the resistance heater. A meander shaped resistance heater is possible, too. With such a measure, the heat transfer to the heat transfer fluid is enhanced. In addition, the possibility of the (not desired) occurrence of hot spots within the resistance heater is reduced.

The heat exchange system is preferably equipped with at least one discharging unit for discharging the heat transfer fluid of the outflow from heat for production of electricity. Heat is removed from the heat transfer fluid. The removed heat is transformed into electricity. In a preferred embodiment, the transformation of heat into electricity is carried by a water/steam cycle for driving a turbine of a steam power plant.

The discharging mode can be realized when electricity prices and demand are high or when the production of renewable energies is low. For that and in order to limit the costs which are connected to embodiments of the invention, it is advantageous to use existing power plants. For instance, well suited are CCPP (combined cycle power plant) since their heat recovery steam generator (HRSG) is similar to the application proposed here. Nevertheless, hard coal, oil, gas, waste incineration, wood or lignite fired power plants can be used since the charging unit can be designed for high temperatures to match the temperatures used in the steam generator. In a hybrid mode the fuel can be used to increase the temperature from the temperature level of the heat exchange system to the operating temperature of the original furnace or boiler design.

Preferably, the heat exchange system is equipped with at least one flow adjusting element for adjusting the heat exchange flow of the heat transfer fluid (through the heat exchange chamber interior of the heat exchange chamber interior of at least one of the heat exchange chambers, the inflow of the heat transfer fluid (into the heat exchange chamber interior of at least one of the heat exchange chambers and/or the outflow of the heat transfer fluid out of the heat exchange chamber interior of at least one of the heat ex-change chambers. Preferably, the flow adjusting element comprises at least one active fluid motion device which is selected from the group consisting of blower, fan and pump and/or the flow adjusting element comprises at least one passive fluid control device which is selected from the group consisting of activatable bypass pipe, nozzle, damper, flap and valve. With the aid of such flow adjusting elements the respective flows of the heat transfer fluid can be adjusted.

The advantage of passive fluid control devices are the low costs. In addition, such devices are cheap. For the case of active fluid moving devices it is preferred to locate driving units of the active fluid motion devices like electrical motors and electrical equipment outside of the heat exchange flow with the (possibly very hot) heat transfer fluid.

In a preferred embodiment, the flow adjusting element comprises at least one flow suppressing element. With the aid of the flow suppressing element it is possible to decouple a specific heat exchange chamber from the heat exchanging process. This heat exchange chamber is deactivated.

Just to be noted: There are different locations for the flow adjusting element possible. The flow adjusting element can be directly arranged in the heat exchange chamber interior, downstream of the heat exchange chamber interior and/or upstream of the heat exchange chamber interior. The location depends—inter alia—on the kind of flow adjusting element (active fluid motion device or passive fluid control device).

In a preferred embodiment, the heat exchange chamber interiors of the heat exchange chambers are conjunct together with the aid of at least one conjunction element for guiding of the heat transfer fluid. The conjunction element comprises two functions: It connects the heat exchange chamber interiors as well as it guides the heat transfer fluid through its interior. By this it is possible to implement flexibly charging and discharging concepts with a duct system comprising a main path and a subsidiary path for the guiding the heat transfer fluid.

One aspect of embodiments of the invention is the individual activation and/or deactivation of the heat exchange chambers. For that purpose, it is advantageous that the heat exchange system comprises at least one ducting element and/or at least one switching element. By these elements it is possible to bypass the heat exchange chamber interior of one of the heat exchange chambers.

In a preferred embodiment, a heat exchange system is provided, wherein the switching element comprises at least one first passive fluid control device for adjusting the inflow of the heat transfer fluid into the heat exchange chamber interior of one of the heat exchange chambers and at least one second passive fluid control device for adjusting the outflow of the heat transfer fluid out of the heat exchange chamber interior of one of the heat exchange chamber and the ducting element comprises at least one bypass pipe for connecting the first passive fluid control device and the second fluid control device (such that heat transfer fluid can be guided through the bypass pipe from the first passive fluid control device to the second passive fluid control device by bypassing the heat exchange chamber interior of one of the heat exchange chambers and a bypass flow of the heat transfer fluid through the bypass pipe and the outflow of one of the heat exchange chambers can be mixed together.

In view of the method the following steps are carried out: the heat exchange chamber interior of one of the heat exchange chambers is bypassed by the heat transfer fluid such that a bypass flow of the heat transfer fluid is generated and the outflow out of the heat exchange chamber interior of one of the heat exchange chambers and the bypass flow are mixed together.

For instance, the first and the second passive fluid control devices are valves. Alternative passive fluid control devices like dampers or flaps are possible, too. These passive fluid control devices are preferably located at the openings of the respective heat exchange chamber.

In a preferred embodiment, just one of the heat exchange chambers comprises a temperature front (temperature gradient) during an operating mode of the heat exchange system. Preferably, the heat exchange chamber with the temperature front is the small heat exchange chamber.

With the above describe system, especially with the bypassing of the heat exchange interior of the small heat exchange chamber with the temperature front, a charging and a discharging of the heat exchange chambers without high thermal losses is possible. The efficiency of the heat exchange system is increased since the charging and discharging cycle duration can be maximized. The negative effect of developing a non-uniform temperature profile due to natural convection can be reduced and the energy losses are reduced.

This is caused by the additional small heat exchange chamber at the respective second opening (cold end) of the main heat exchange chamber. Just the small heat exchange chamber comprises the temperature gradient. Hence the temperature profile in the main heat exchange chamber is not flattening out and the efficiency of the whole heat exchange system is increased by even out load curves for re-electrification purpose.

Preferably, the heat exchange chamber interior of the subsidiary (small) heat exchange chamber is bypassed. But it is also possible that the heat exchange chamber interior of the main heat exchange chamber is bypassed.

In a preferred embodiment, the bypass pipe (comprises at least one passive bypass pipe fluid control device and/or at least one active bypass fluid motion device. With these devices the bypass flow can be adjusted.

The heat storage material can be liquid and/or solid. For instance, a core of the heat storage material is solid and a coating of this solid core is liquid. Such a liquid coating can comprise ionic liquid.

The solid material comprises preferably bulk material. Mixtures of different liquid materials and different solid materials are possible as well as mixtures of liquid and solid materials.

It is possible that the heat storage material is a thermo-chemical energy storage material: Thermal energy can be stored via an endothermic reaction whereas thermal energy can be released via an exothermic reaction. Such a thermo-chemical storage material is for instance the calcium oxide/calcium hydroxide system.

The heat storage materials can be arranged in one or more specific containers made of non-reactive container material. Non-reactive means that no chemical reaction between the heat storage material and the container material takes place during the heat exchange process.

In a preferred embodiment, the heat storage material comprises at least one chemically and/or physically stable material. In the range of the operational temperature of the heat exchange system the heat storage material does not change its physical and/or chemical properties. A physically stable material does not change its physical properties during the heat exchange. For instance, the heat storage material remains in a solid state in the operating temperature range. A chemically stable material does not change its chemical composition during the heat exchange. For instance, such a chemically stable material is a phase change material (PCM).

Moreover, a complex heat exchange system with different heat exchange chambers with different heat storage materials and/or different heat transfer fluids is possible, too. For Instance, a heat exchange chamber with stones as heat storage material and a heat exchange chamber with a phase change material as a heat storage material are combined together (in parallel or in series).

In a preferred embodiment, the heat storage material comprises sand and/or stones. The stones can be natural stones or artificial stones. Mixtures thereof are possible, too. Artificial stones can consist of containers which are filled with heat storage material. This heat storage material is for instance a phase change material or a thermo-chemical storage material (see above).

Preferably, the stones comprise gravel (pebbles), rubbles and/or grit (splits). The artificial material comprises preferably clinkers or ceramics. Again, mixtures of the mentioned materials are possible, too.

In order to provide a cheap energy storage material it is advantageous to use waste material. Therefore, in a preferred embodiment, the artificial material comprises at least one by-product of an industrial process. For instance, the by-product is iron silicate. Iron silicate origins from a slag of copper production.

In a preferred embodiment, heat exchange channels are embedded in the heat storage material for guiding of the heat exchange flow through the heat exchange chamber interior. The heat storage material forms a heat exchange bed. The heat exchange bed comprises the heat exchange channels. The heat exchange channels are embedded into the heat storage bed such that the heat exchange flow of the heat transfer fluid through the heat exchange channels causes the heat exchange between the heat storage material and the heat transfer fluid. The heat exchange channels can be formed by interspaces (gaps) of the heat storage material. For instance, the heat storage material comprises stones. The stones form the heat exchange bed with the heat exchange channels. In addition or alternatively, the heat storage material is porous. Open pores of the heat storage material form the heat exchange channels.

The heat transfer fluid is selected from the group consisting of a liquid and a gas. The gas is selected from the group consisting of inorganic gas and/or organic gas. The inorganic gas is preferably air. Mixtures of different liquids are possible as well as mixtures of different gases.

Preferably, the heat transfer fluid comprises a gas at ambient gas pressure. Preferably, the gas at the ambient pressure is air. The ambient pressure (900 hPa to 1.100 hPa) varies such that the heat exchange flow through the heat exchange chamber interior is caused.

For the guiding of the heat transfer fluid into the heat exchange chamber interior and for the guiding of the heat transfer fluid out of the heat exchange chamber interior a pipe system (or channel system, ducting system) is used. This pipe system can be closed (with a closed loop) or can be open (with an open loop).

For instance the heat transfer fluid is ambient air of the environment. The loop is an open loop. Air from the environment is introduced into the heat exchange system and air of the heat exchange system is released to the surroundings. There is an air exchange during the operation of the heat exchange system.

In contrast to that, there is no air exchange or a selectively adjustable air exchange during the operation in a closed loop. Air of the environment is not added or just added on a small scale to the air which is used as heat transfer fluid. This has following specific advantage: In a situation with almost completely charged heat storage material, heat transfer fluid with remaining heat would be released to the environment in an open loop. The remaining heat is lost. In contrast to that, in a closed loop this heat transfer fluid with remaining heat stays in heat exchange system. The remaining heat is not lost. Therefore, in a preferred embodiment, a closed loop is implemented and wherein the inflow comprises the outflow. The outflow is guided back into the heat exchange chamber interior.

At least one of the heat exchange chamber is a vertical heat exchange chamber and/or at least one of the heat exchange chambers is a horizontal heat exchange chamber. The term "horizontal heat exchange chamber" implies a horizontal main (average) flow of the heat transfer fluid through the heat exchange chamber interior. The flow direction of the horizontal main flow is essentially parallel to the average surface of the earth. The horizontal direction is essentially a perpendicular direction to the direction of the gravity force which affects the heat transfer fluid. Perpendicular means in this context that deviations from the perpendicularity of up to 20° and preferably deviations of up to 10° are possible.

A horizontally oriented direction of the heat exchange flow can be achieved by lateral first openings and/or lateral second openings. The horizontal heat exchange chamber comprises these openings in its side heat exchange chamber boundaries. In addition, with the aid of an active fluid motion device like a blower or a pump the heat exchange flow in the heat exchange chamber interior is caused. The heat transfer fluid is blown or pumped into the heat exchange chamber interior or is pumped or sucked out of the heat exchange chamber interior.

In contrast to the term "horizontal heat exchange chamber", the term "vertical heat exchange chamber" implies a vertical main flow of the heat transfer fluid through the heat exchange chamber interior. For instance, the operating mode is the charging mode. In a vertical heat exchange chamber the heat exchange flow is preferably directed downwards (top down) during the charging mode. The vertical main flow (essentially parallel but in the opposite direction to the direction of gravity force) can be caused by an active fluid motion device (blower or pump). The first opening is located at a top of the heat exchange chamber and the second opening is located at a bottom of the heat exchange chamber.

Based on natural convection, in a vertical heat exchange chamber the temperature of the heat storage material along a cross section perpendicular to the flow direction of the heat transfer fluid is approximately the same (horizontal isothermal lines).

In contrast to that, in a horizontal heat exchange chamber due to natural convection the temperature of the heat storage material along the cross section perpendicular to the flow direction of the heat transfer fluid (see below) can differ (inclined isothermal lines).

It has to be noted that the terms "horizontal" and "vertical" are independent from the dimensions of the heat exchange chamber and its orientation. Decisive is the direction of the flow of the heat transfer fluid through the heat exchange chamber interior. For instance, a "horizontal heat exchange chamber" can have a chamber length which is less than the chamber height of the heat exchange chamber.

Besides pure vertical and horizontal heat exchange chambers, a mixture of "vertical heat exchange chamber" and "horizontal heat exchange chamber" is possible, too. In such a heat exchange chamber, the main flow of the heat transfer fluid is the result of horizontal and vertical movement of the heat transfer fluid through the heat exchange chamber interior.

In a preferred embodiment, at least two first openings are arranged vertically to each other and/or at least two second openings are arranged vertically to each other. Openings are arranged above each other. By this measure it is possible to influence a vertical distribution of heat exchange flows in order to improve a temperature distribution (temperature front) in the heat storage material and heat exchange chamber interior respectively. Isothermal lines perpendicular to the flow direction are influenced.

The temperature front is defined by neighboring cold and hot areas of the heat storage material in the heat exchange chamber interior caused by the flow of the heat transfer fluid through the heat exchange chamber interior. The temperature front is aligned perpendicular to the respective flow direction of the heat exchange flow through the heat exchange chamber. During the charging mode the heat exchange flow is directed in a charging mode direction wherein the temperature front moves along this charging mode direction. In contrast to that, during the discharging mode the heat exchange flow is directed in the discharging mode direction (opposite to the charging mode direction) wherein the temperature front moves along the discharging mode direction. In both cases, the temperature front of the heat exchange chamber is migrating through the heat exchange chamber to the respective hot/cold ends of the heat exchange chamber. It is to be noted that in case of countercurrent operation, the hot (hot opening) end remains the hot end (hot opening), independently from the mode (charging mode or discharging mode).

The temperature front is a zone of strong temperature gradient in the heat storage material, i.e. high temperature difference between hot and cold areas. In this application it separates the hot (charged with heat) and the cold (not charged) zone in the heat exchange chamber with the heat storage material. The temperature front develops due to the transfer of heat from the heat transfer fluid to the heat storage material during the charging mode and due to the transfer of heat from the heat storage material to the heat transfer fluid during the discharging mode. Isothermal zones/lines develop ideally (e.g. without the influence of gravitation) perpendicular to the main flow direction, i.e. zones/lines of constant temperature.

In order to optimize the efficiency of the heat exchange system it is advantageous to ensure a uniform temperature front. There are just small variations concerning the temperature gradients perpendicular to the flow direction. In a vertical heat exchange chamber with a flow direction top down, the temperature front is nearly uniform due to natural convection. So, in this case additional measures are not necessary. In contrast to that, natural convection leads to a non-uniform temperature front in a horizontal heat exchange chamber. So, in this case additional measures could be meaningful (like usage of more openings or usage of more flow adjusting elements).

Preferably, the chamber boundary with one of the openings comprises a transition area with a tapering profile such that an opening diameter of the opening aligns to a first tapering profile diameter of the tapering profile and a chamber diameter of the heat exchange chamber aligns to a second tapering profile diameter of the tapering profile. The transition area comprises an increasing cross section from the respective opening towards the heat exchange chamber. This is especially advantageous for the first opening for guiding the heat transfer fluid into the heat exchange chamber. The diameter of the transition area expands from the opening diameter of the first opening to the diameter of the heat exchange chamber. With the aid of the tapering profile the inflow of the heat transfer fluid is guided into the heat exchange chamber interior. The guided inflow is distributed to a wide area with the heat storage material. By this measure a capacity of the heat exchange unit (heat storage material which is located in the heat exchange chamber) can be highly exploited. In addition, the efficiency of the heat exchange can be improved by adapting the heat exchange flow. Remark: For additionally adapting the heat exchange flow, a diffuser can be located at the first opening, especially in the transition area. By means of the diffuser an incident flow of the heat transfer fluid into the heat exchange chamber interior can be adjusted. For instance, such a diffuser is formed by stones which are located in the transition area with the tapering profile.

For the case that the heat exchange chamber comprises a number of first openings it is very advantageous to arrange a described transition area at that number of first openings. Thereby, the first openings can comprise a joint transition area or individual transition areas.

The transition area with the second opening for guiding the heat transfer fluid out of the heat exchange chamber interior can be tapered, too. By this measure the guiding of heat flow out of the heat exchange chamber interior of the heat exchange chamber is simplified.

In this context, the use of a short transition area is very advantageous. For instance, the short transition area comprises a dimension which is less than 50% of a length of the heat exchange chamber. For instance, the dimension is about 20% of the length of the heat exchange chamber. The length is the dimension of the heat exchange chamber that is parallel to the main flow direction of the heat transfer fluid through the heat exchange chamber interior. But of course, the dimension of the transition area is dependent on a number of features of the complete heat exchange system, e.g. temperature of the heat transfer fluid, mass flow of the heat exchange flow, speed of the heat exchange flow at the relevant opening temperatures, etc.

In order to save space and in order to reduce the surface-volume ratio for a reduced heat loss, it is advantageous to implement a transition area as short as possible. The result is a short transition channel for guiding the inflow into the heat exchange chamber interior. Besides an efficient usage of the capacity of the heat exchange chamber a low space requirement is connected to this solution.

Preferably, the heat exchange chamber comprises a cylindrically shaped chamber boundary. For instance, the chamber boundary which comprises the first opening is formed as a circular cylinder and/or the chamber boundary with the second opening is formed as a circular cylinder. Such shapes lead to best surface-volume ratios.

The dimensions of the heat exchange chamber can be different. But, embodiments of the invention are especially advantageous for heat exchange systems with large heat exchange chambers. Therefore, in a preferred embodiment, the horizontal heat exchange chamber comprises a heat exchange chamber length which is at least twice of a heat exchange chamber width of the heat exchange chamber and/or which is at least twice of a heat exchange chamber height of the heat exchange chamber. Preferably, the heat exchange chamber length is selected from the range between 20 m and 300 m. In addition, the heat exchange chamber width and/or the heat exchange chamber height are selected from the range of 1 m to 100 m.

The heat exchange system is especially adapted for operation at high temperatures of more than 300° C. Therefore, in a preferred embodiment, an operating temperature of the operating mode is selected from the range between 300° C. and 1000° C., preferably selected from the range between 500° C. and 1000° C., more preferably selected from the range between 600° C. and 1000° C., 650° C. to 1000° C. and most preferably between 700° C. and 1000° C. A deviation of the temperature ranges is possible. In this context, very advantageous is an upper limit of the temperature range of 900° C. and most preferably an upper limit of the temperature range of 800° C. The heat exchange system is a high temperature heat exchange system.

The following can be applied for renewable energy production as well as for conventional energy production. For instance, in order to increase the flexibility the steam cycle of fossil fired power plants (or nuclear power plants, etc.) it can be combined with the heat exchange system proposed here. In this case, the boiler of the steam cycle of the power plant can be operated with fuel when fuel costs are lower than electricity costs and the heat exchange system is charged in periods when electricity prices are low. Alternatively, the charging can take place during a period of excess production of energy.

With embodiments of the invention following specific advantages are achieved:
- With the aid of the heat exchange system thermal energy can be flexibly stored and released.
- The heat storage chambers of the exchange system can be activated or deactivated. All heat exchange chambers or just specific heat storage chambers participate in the charging mode and/or discharging mode of the heat exchange system.
- By embodiments of the invention a combination of a small heat exchange chamber and a main heat exchange chamber is provided. Preferably, just the small heat exchange chamber is containing the temperature gradient.

BRIEF DESCRIPTION

Some of the embodiments will be described in detail, with references to the following Figures, wherein like designations denote like members, wherein.

DETAILED DESCRIPTION

Figure 1:
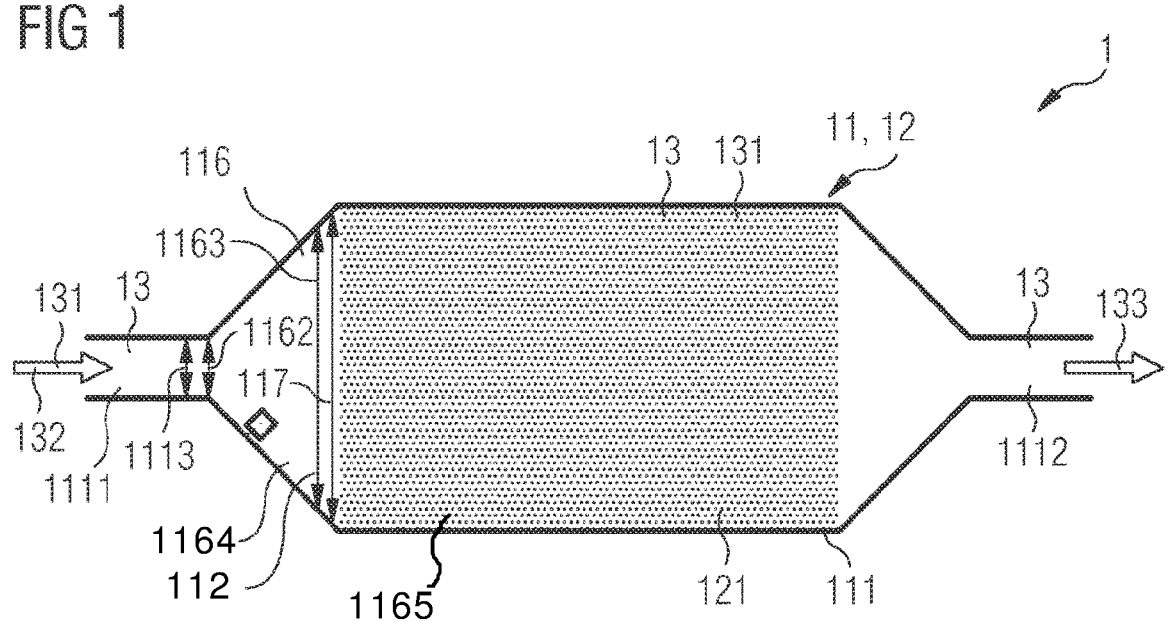
FIG. 1 shows a heat exchange chamber of the heat exchange system.

Core of embodiments of this invention is a heat exchange system 1 with at least two heat exchange chambers 11 and 12 on a high temperature level. One of the heat exchange chambers is a main heat exchange chamber and one of the heat exchange chambers 11 and 12 is a subsidiary heat exchange chamber. This subsidiary heat exchange chamber is a boost heat exchange chamber for charging the main heat exchange chamber.

Heat storage material 121 (e.g. stones or sand) which is located in the heat exchange chamber interior 112 of the heat exchange chamber 11 and 12 and can be charged and discharged with heat via the heat transfer fluid 13. Heat is stored by the heat storage material 121 and can be released from the storage material 121.

The temperature level of the stored heat is significantly higher compared to methods applied so far to increase the efficiency. The temperature level lies between 300° C. and 1000° C., preferably between 500° C. and 1000° C., more preferably between 650° C. and 1000° C. and most preferably between 700° C. and 1000° C. The thermal capacity of the heat exchange system 1 lies in the range between 0.3 GWh and 100 GWh, which causes a thermal power of 50 MW.

The heat exchange chambers 11 and 12 comprise heat exchange chamber boundaries 111 which surround at least one heat exchange chamber interior 112 of the heat exchange chambers 11 and 12. The heat exchange chamber 11 and 12 are a horizontal heat exchange chambers.

The heat exchange chamber boundaries 111 comprise at least one first opening 1111 for guiding in an inflow 132 of at least one heat transfer fluid 131 into the heat exchange chamber interior 112 and at least one second opening 1112 for guiding an outflow 133 of the heat transfer fluid 131 out of the heat exchange chamber interior 112. At least one heat storage material 121 is arranged in the heat exchange chamber interior 112 such that a heat exchange flow 13 of the heat transfer fluid 131 through the heat exchange chamber interior 112 causes a heat exchange between the heat storage material 121 and the heat transfer fluid 131.

Exemplarily, the heat exchange chamber length of the horizontal heat exchange chamber 11 is about 200 m, the heat exchange chamber height of the heat exchange chamber 11 is about 10 m and the heat exchange chamber width of the heat exchange chamber is about 50 m.

With the aid of the proposed heat exchange system 1, thermal energy can be stored on a high temperature level during the charging mode. This stored thermal energy can be used during the discharging mode for the production of steam in a water steam cycle for reconversion into electrical energy.

The heat exchange chamber 11 and the further heat exchange chamber 12 are filled with solid heat storage material 121. The solid heat storage material 121 comprises stones. Alternatively, sand is used as heat storage material 121.

There are transition area 116 of the heat exchange chambers 11 and 12 with tapering profiles. Thereby an opening diameter 1113 of the opening 1111 or 1112 aligns to a first tapering profile diameter 1162 of the tapering profile and a chamber diameter 117 of the heat exchange chambers 11 or 12 aligns to a second tapering profile diameter 1163 of the tapering profile.

The inflow 132 of the heat transfer fluid 13 is guided into the heat exchange chamber interior 112. The guided inflow 132 is distributed to a wide area of heat storage material 121. By this measure a capacity of the heat exchange unit (heat storage material 121 which is located in the heat exchange chamber interior 112) can be utilized in an advantageous manner.

The transition areas 116 of the heat exchange chambers 11 and 12 are short. The short transition areas 116 project into the respective heat exchange chambers 11 and 12. In each case, the result is a short transition channel for the guiding of the inflow 132 of the heat transfer fluid into the heat exchange chamber interior 112 of the heat exchange chambers 11 and 12.

The heat exchange chambers 11 and 12 are arranged such that the inflow 132 of the heat transfer fluid 131 into the heat exchange chamber interior 112 of one of the heat exchange chambers (11, 12) comprises the outflow 133 of the heat transfer fluid 131 out of the heat exchange chamber interior 112 of the other heat exchange chamber 12 and 11

The heat exchange system 1 is additionally equipped with at least one flow adjusting element 134 for additionally adjusting a mass flow of the heat exchange flow 13 of the heat transfer fluid 131 through the heat exchange chamber interior 112 of the respective heat exchange chamber 11 and 12. The flow adjusting element 134 is an active fluid motion device 1341 like a blower or a pump. Such a device enables a transportation of the heat transfer fluid 131 through the heat exchange chamber interior 112 of the heat exchange chambers 11 and 12. The blower or the pump can be installed upstream or downstream of to the heat exchange chamber 11 and 12.

In the charging mode, the heat transfer fluid 131 enters the heat exchange chamber 11 through a diffuser 1164. The diffuser 1164 comprises stones 1165 and is arranged at the transition area 116 of the heat exchange chamber 11.

Figure 3:
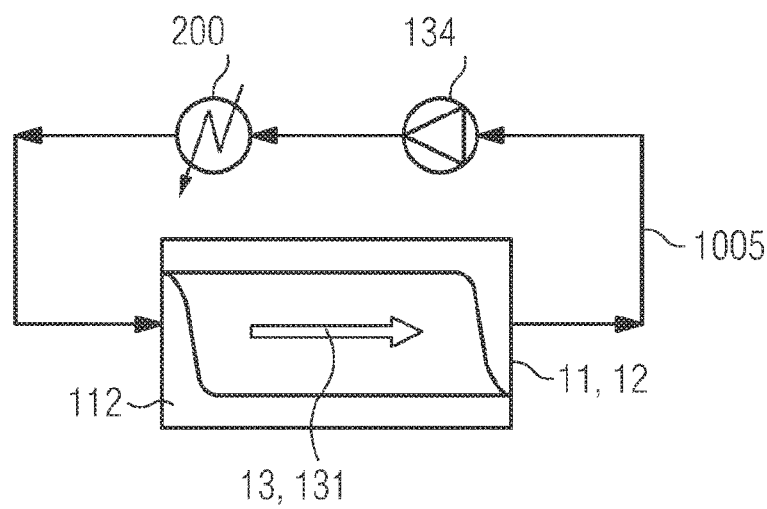
FIG. 3 shows the heat exchange system in a charging mode.

The heat exchange flow 13 of the heat transfer fluid 131 is directed in the charging mode direction (see arrow in FIG. 3). The additional flow adjusting element 134 is advantageous installed upstream of the charging unit 200 (FIG. 3): Relatively cold heat transfer fluid passes the flow adjusting element 134 before absorbing heat from the charging unit.

Figure 2:
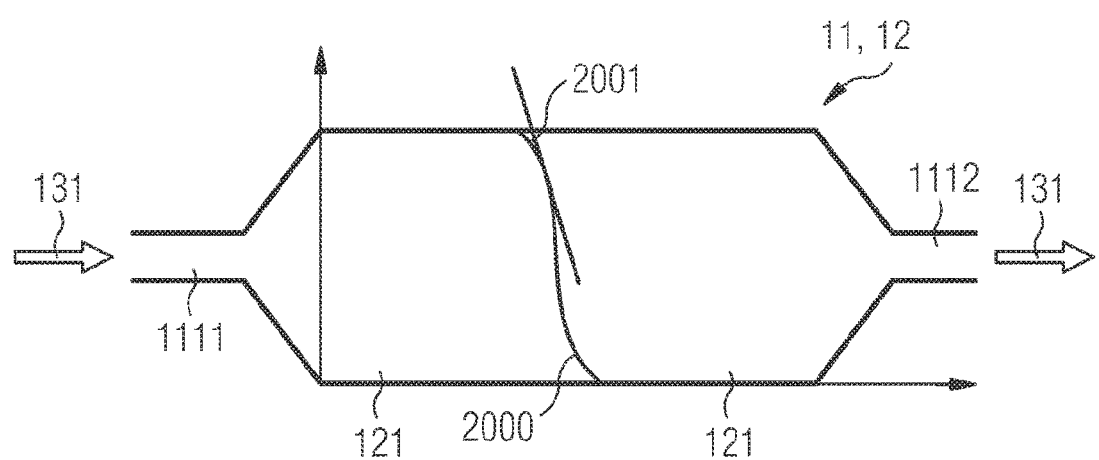
FIG. 2 shows a temperature distribution of the heat exchange chamber of FIG. 1 in a charging mode.

For the charging mode, the heat transfer fluid 131 is heated up by the electrical heating device (charging unit 200). This charged (heated) heat transfer fluid is guided into the heat exchange chamber interior 112 of the heat exchange chamber 11 for charging of the heat storage material. Thereby the heat exchange between the heat transfer fluid and the heat storage material takes place. With reference 2000 the temperature front at a certain time of this charging process is shown (FIG. 2). In addition, the temperature gradient 2001 which results in the temperature front is depicted.

For the discharging mode the heat exchange system 1 comprises one or several heat exchange chambers 11 mentioned above, an active fluid motion device 134 to circulate the heat transfer fluid 131 and a thermal machine for re-electrification, which can be a water/steam cycle 1003. The working fluid of this cycle is water and steam. The water/steam cycle 1003 has the function of a discharging unit 400. Essential components of the steam turbine cycle 1003 are a steam turbine 1006 and a generator 1004.

Figure 4:
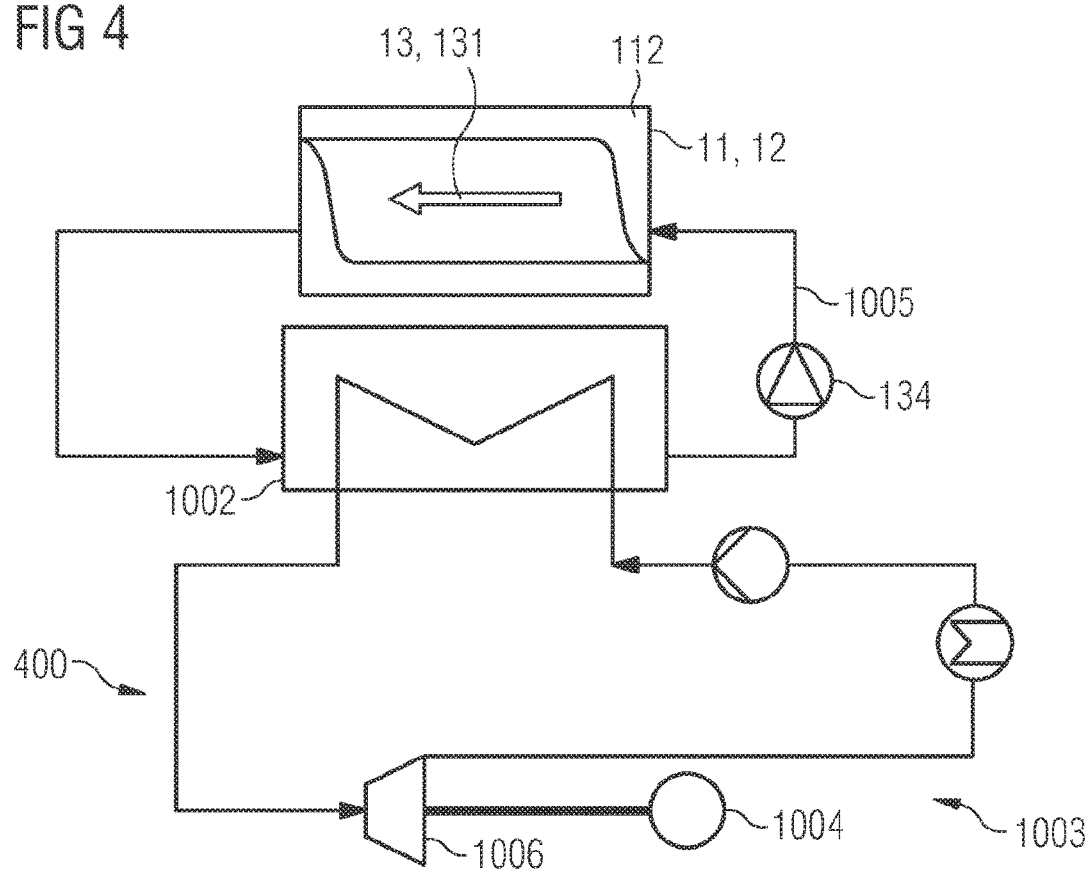
FIG. 4 shows the same heat exchanges system in a discharging mode.

In the discharging mode, the heat exchange flow of the heat transfer fluid is directed into the discharging mode direction (see arrow in FIG. 4) (FIGS. 3 and 4 refer to a heat exchange system with the same heat exchange chamber 11).

With the aid of the heat exchange system (heat exchanger) 1002 heat of the heat transfer fluid is transferred to the working fluid of the steam cycle 1003.

The heat exchange system 1 comprises a closed loop 1005. Heat exchange fluid which has passed the heat exchange chamber interior 112 is guided back into the heat exchange chamber interior 112.

Figure 5:
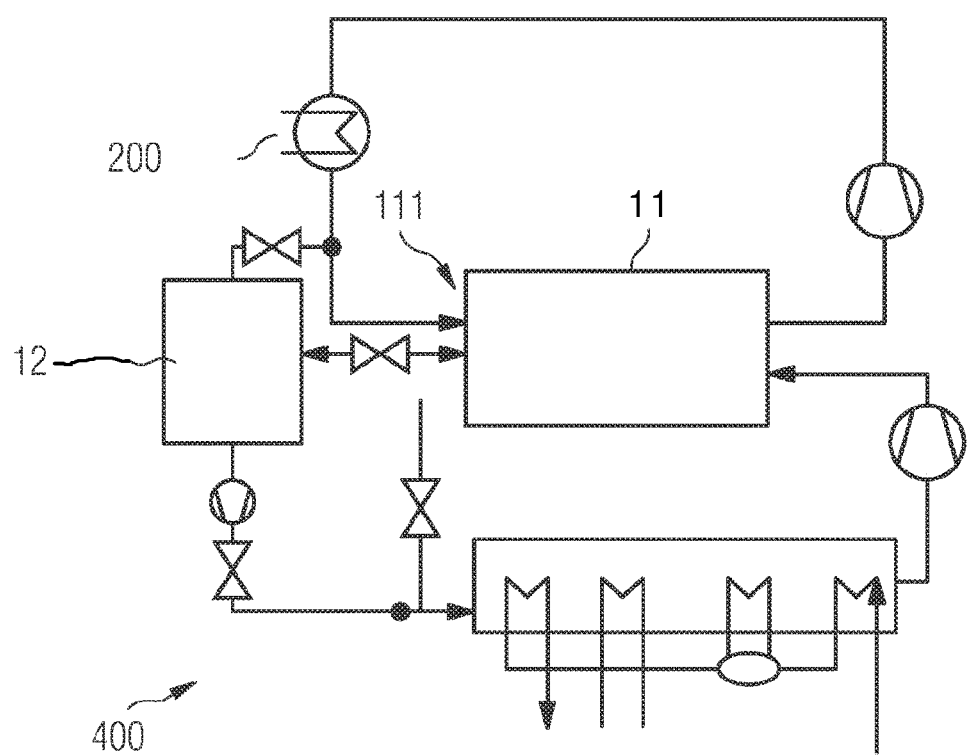
FIG. 5 shows a heat exchange system with small subsidiary heat exchange chamber and big main heat exchange chamber.

Following additional aspects of embodiments of the invention:

Concerning FIG. 5, the small heat exchange chamber 12 is installed at a hot end 111 of the main heat exchange chamber 11.

In contrast to that, concerning FIGS. 6 to 16 the small (subsidiary) heat exchange chamber 12 is located at the respective cold end (second opening 1112) of the main heat exchange chamber (11). The small heat exchange chamber has a lower capacity than the main heat exchange chamber.

Figure 6:
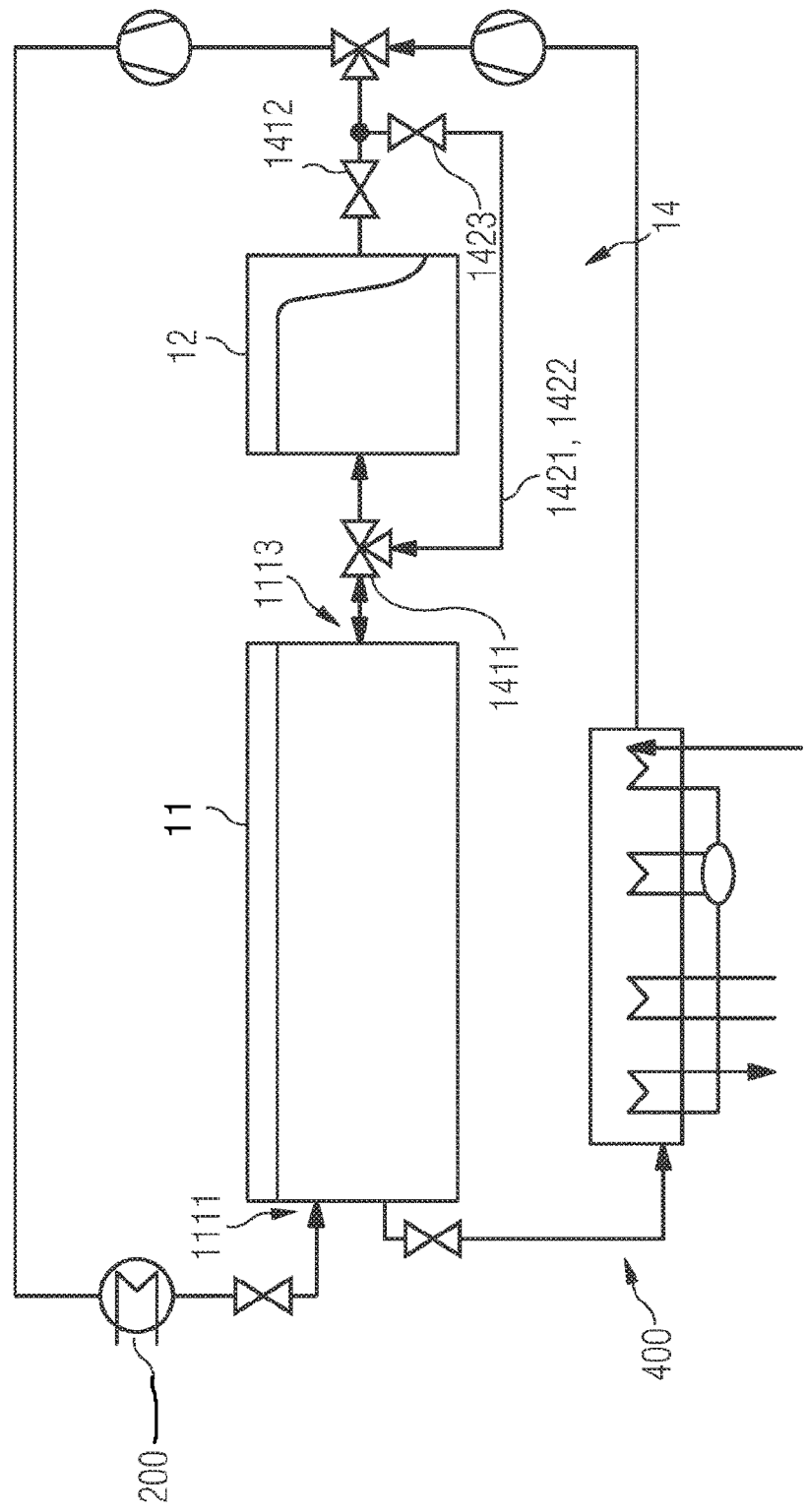
FIG. 6 shows an embodiment of a heat exchange system with small subsidiary heat exchange chamber and big main heat exchange chamber.
Figure 7:
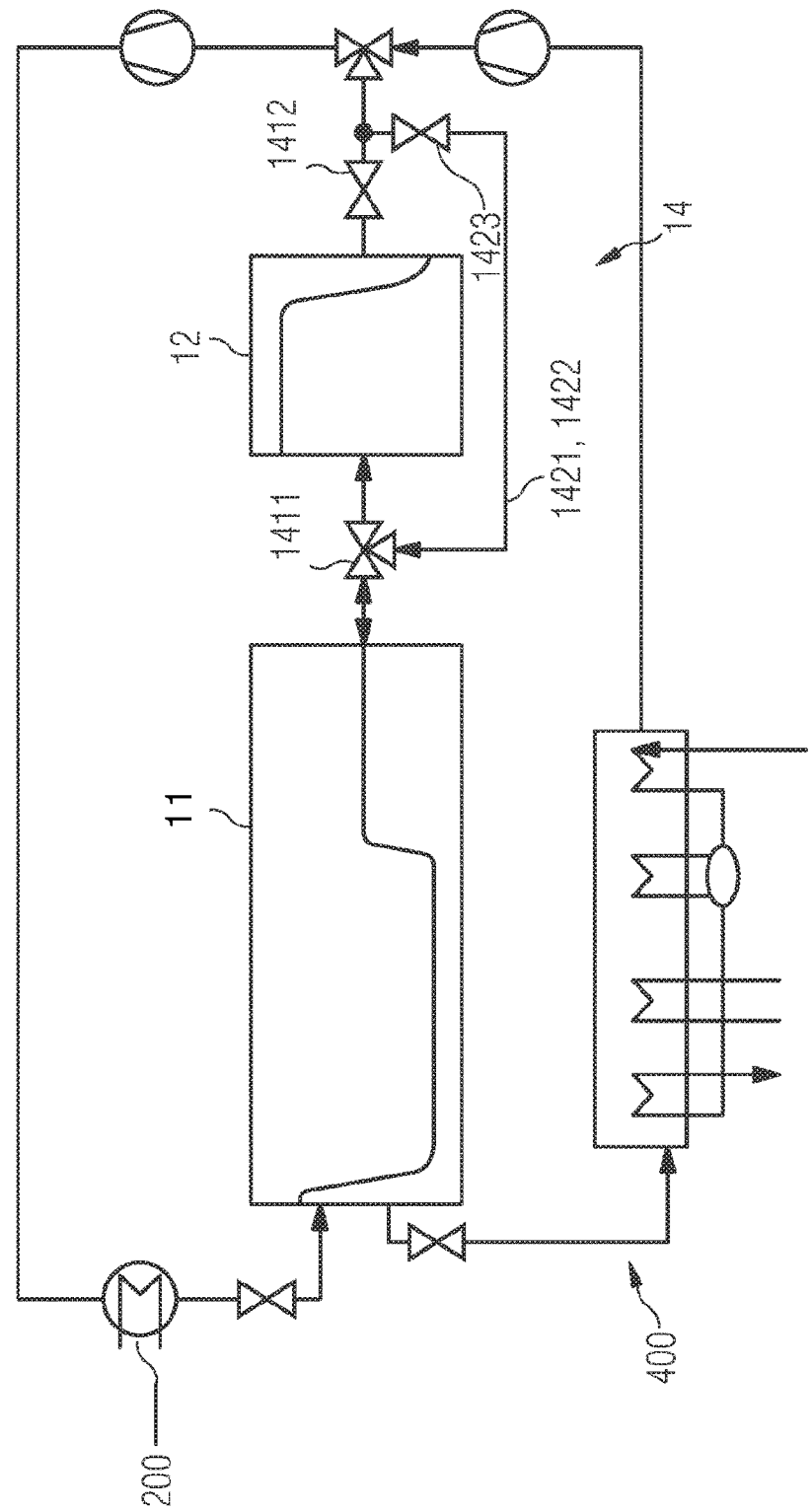
FIG. 7 shows another embodiment of a heat exchange system with small subsidiary heat exchange chamber and big main heat exchange chamber.
Figure 9:
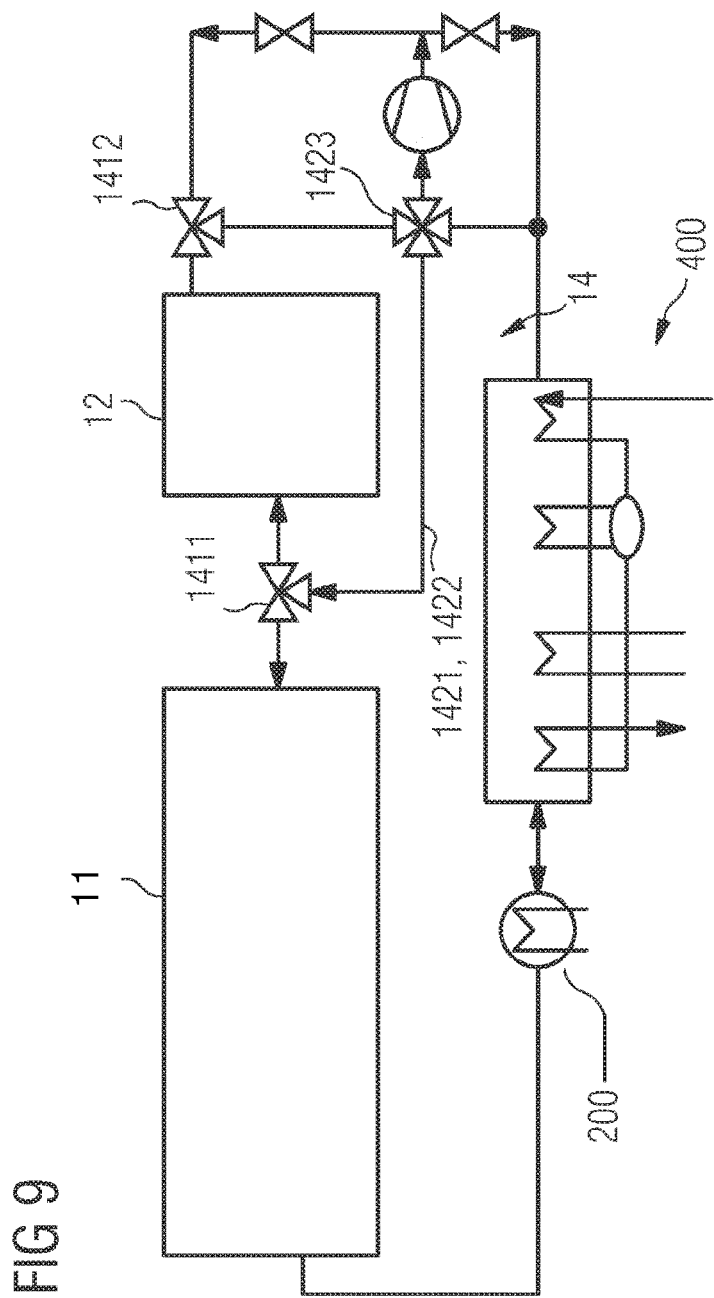
FIG. 9 shows another embodiment of a heat exchange system with small subsidiary heat exchange chamber and big main heat exchange chamber.
Figure 10:
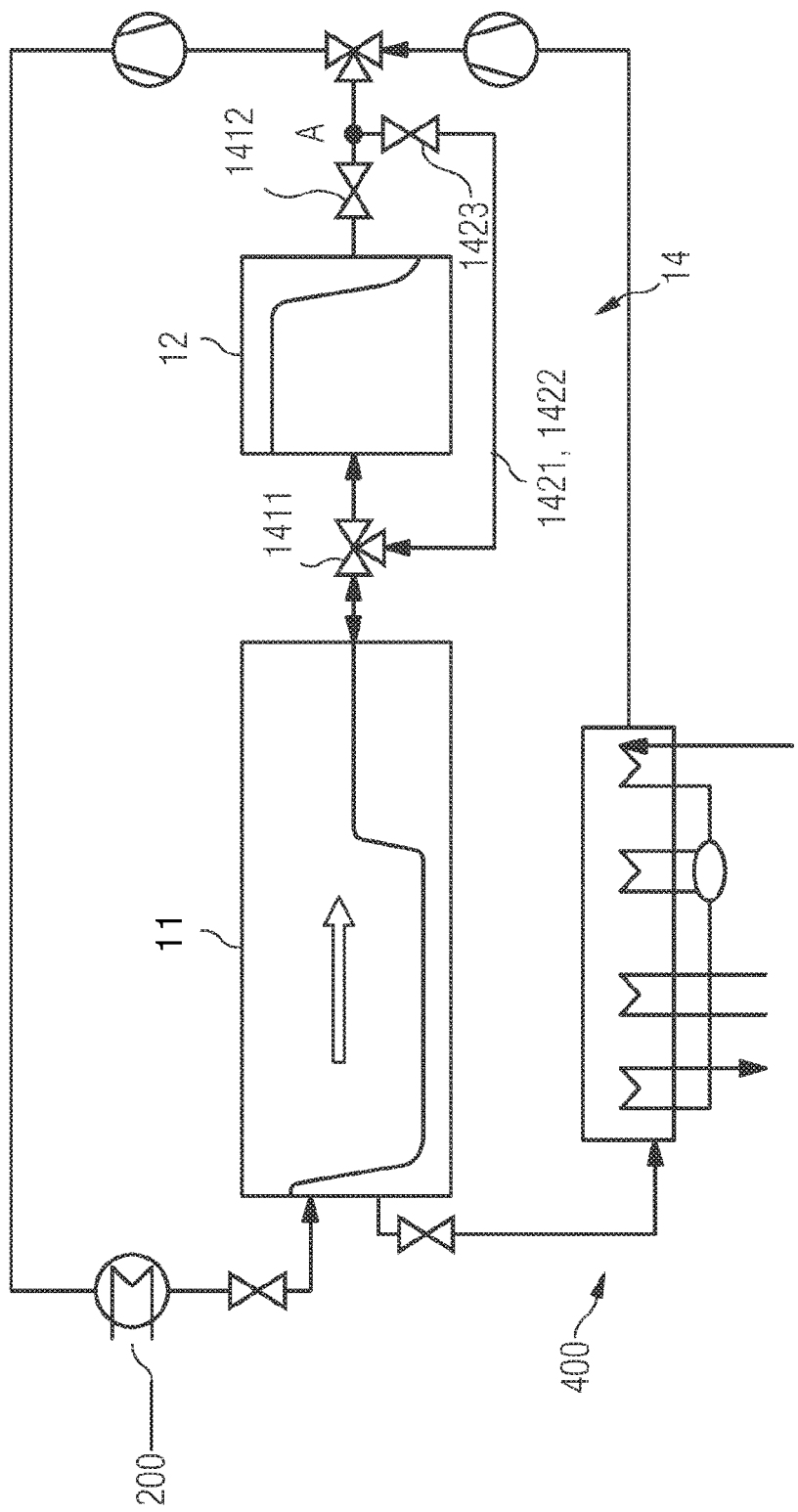
FIG. 10 shows another embodiment of a heat exchange system with small subsidiary heat exchange chamber and big main heat exchange chamber.
Figure 11:
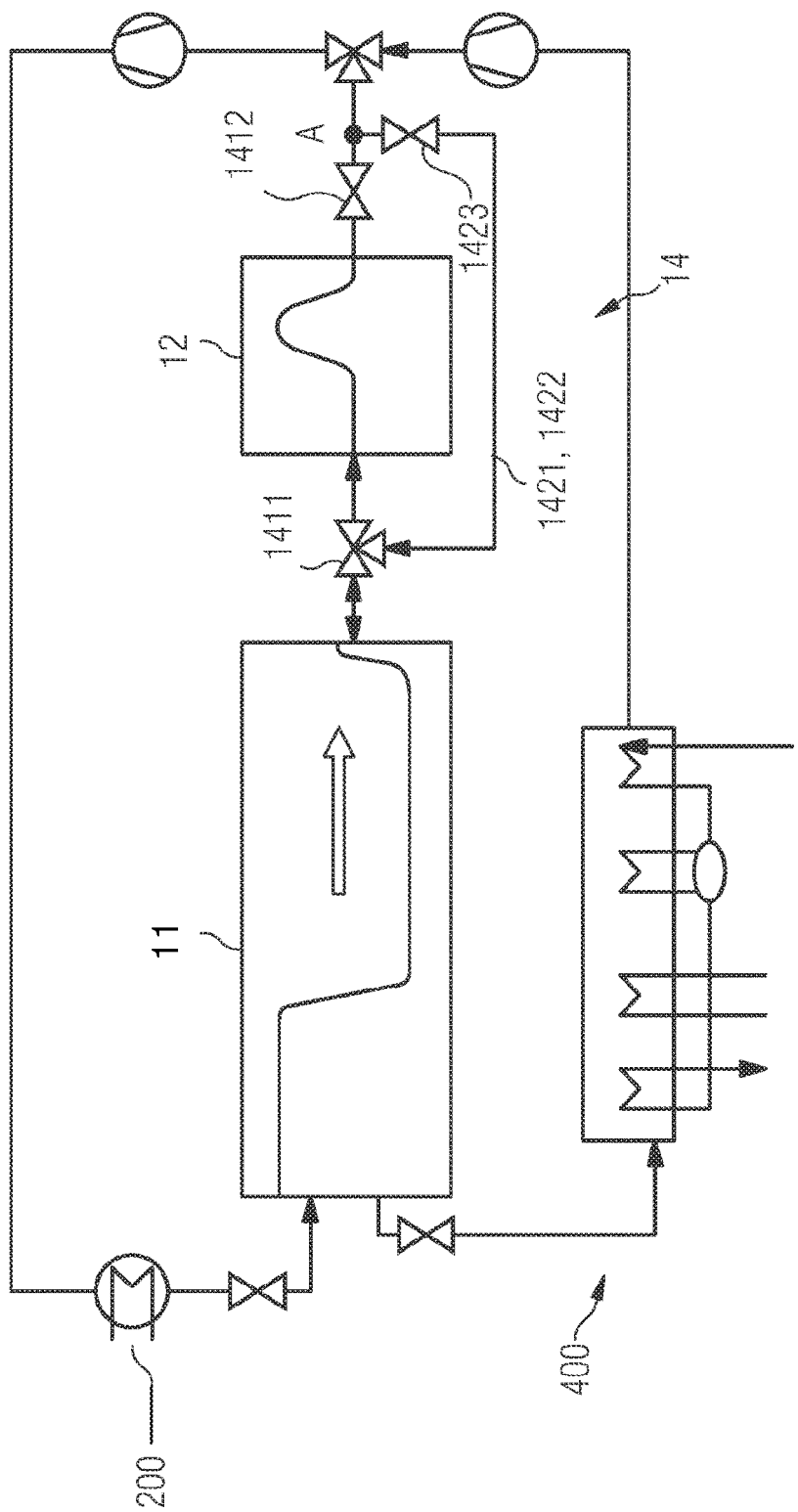
FIG. 11 shows another embodiment of a heat exchange system with small subsidiary heat exchange chamber and big main heat exchange chamber.

The heat exchange chambers are connected with an array of valves and an additional gas path for discharging purpose, as shown in FIGS. 6 and 7. It is also possible that the additional gas path has its own blower, as shown in FIG. 9, or to use only one blower at the cold system site situated in an array of valves for charging and discharging, as shown in FIG. 10. Following components are depicted: First passive fluid control device 1411, second passive fluid control device 1412, bypass pipe of the ducting element 1421, bypass flow of the heat transfer fluid through the bypass pipe 1422, passive bypass pipe control device 1423 and active bypass pipe fluid motion device 1424.

When charging the heat storage units for the first time the heat exchange flow of the heat transfer fluid is guided first through the main heat exchange chamber, leaves it at its respective cold end and enters the small heat exchange chamber, before the heat transfer fluid (air) is guided via the blower back into the heating device (charging unit 200).

The charging state of the heat exchange system depends on the availability of renewable energies, if there is an high occurrence on wind or there is high solar radiation, the charging process is stopped when the main heat exchange chamber is fully charged (e.g. at temperature level 650° C.) over its length and the temperature gradient is limited to the small heat exchange chamber (e.g. as shown in FIG. 7).

If there is a low occurrence on wind or solar radiation, the main heat storage chamber will not be fully charged.

When the heat storage chambers are in idle mode they are disconnected from each other with installed valves. This prevents a mass flow between of the heat transfer fluid between the heat exchange chamber interiors of the heat exchange chambers.

In discharge mode only the heat in the main heat exchange chamber is used for re-electrification purpose. Therefore the air is guided with the additional gas path and the valves only through the heat exchange chamber interior of the main heat exchange chamber. The heated mass flow of the heat transfer fluid is then guided through the heat recovery steam generator (HRSG) and the exhaust air of the HRSG is used for re-storing in the main heat exchange chamber again, as shown in FIG. 8.

Figure 8:
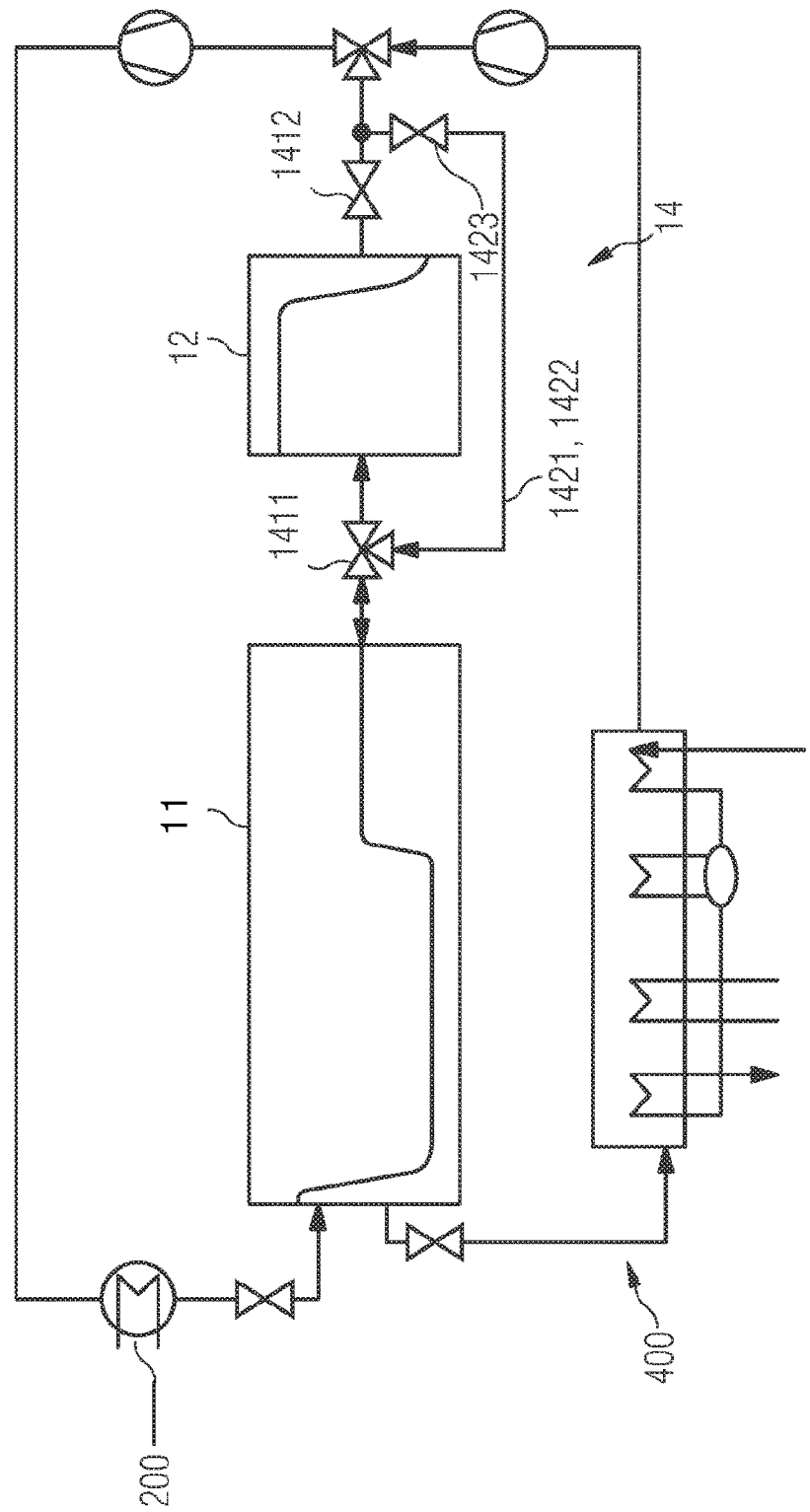
FIG. 8 shows another embodiment of a heat exchange system with small subsidiary heat exchange chamber and big main heat exchange chamber.

It is also possible to use a small discharge blower for the discharging the main heat exchange chamber, as shown in FIG. 8.

It is also conceivable to charge the heat exchange chambers in series with the heating device (discharging unit 200)

and the HRSG in one single (joint) gas path. Therefore, the hot ends of the heat exchange chambers are connected with the charging unit 200, the charging unit 200 is connected in line with the HRSG and the exhaust gas from the HRSG is guided back into the cold end of the main heat exchange chamber and is stored again, which is shown in FIG. 10.

In the second charging phase the stored heat in the small heat exchange chamber, from the first charging phase mentioned above, is guided through the charging unit 200 and is used for heating purpose to safe energy for the charging process of the main heat exchange chamber. The temperature profile of small heat exchange chamber will run through the small heat exchange chamber during the charging. This will cause a not non-consistent inlet temperature of the charging unit 200.

The improvement lies in the usage of the additional gas path for charging purpose for adapting the inlet temperature of the charging unit 200 with the installed valves.

When the temperature gradient is running through the small heat exchange chamber and the outlet temperature of the small heat exchange chamber is rising, the mass flow is adapted by a valve V so that there is a mixing temperature in Point A afterwards. Therefore, the mass flow will be split after leaving the main heat exchange chamber into two flows. The first flow m1 is guided through the small heat exchange chamber and will be move the temperature gradient towards the cold end. The second flow m2 is guided thought the additional gas path and has the outlet temperature of the main heat exchange chamber. Both will be brought together in point A, see FIGS. 10 and 11. This means that the temperature at the respective cold end of the main heat exchange chamber is low, while the temperature distribution in the small heat exchange chamber is irregular, depending on the number of charge and discharging cycles. These mass flows m1 and m2 have to be mixed so that the mass flow temperature in Point A, guarantees controllable entry temperature of the charging unit 200 over the charging period.

In discharge mode only the heat in the main heat storage is used for re-electrification purpose. Therefore the air is guided in reverse direction with the bypass and the valves only through the main heat exchange chamber. The heated mass flow is then guided through the HRSG and the exhaust air of the HRSG is used for re-storing in the main heat energy storage again, as shown in FIG. 7. It is also possible to use a small discharge blower for the discharging the main heat storage unit, as shown in FIG. 8.

It is also conceivable to charge the heat storage units in series with the heating device and the HRSG in one gas path. Therefore the hot ends of the storages are connected with the heater, the heater is connected in line with the HRSG and the exhaust gas from the HRSG is guided back into the cold end of the main heat storages and is stored again, which is shown in FIG. 9.

Figure 12:
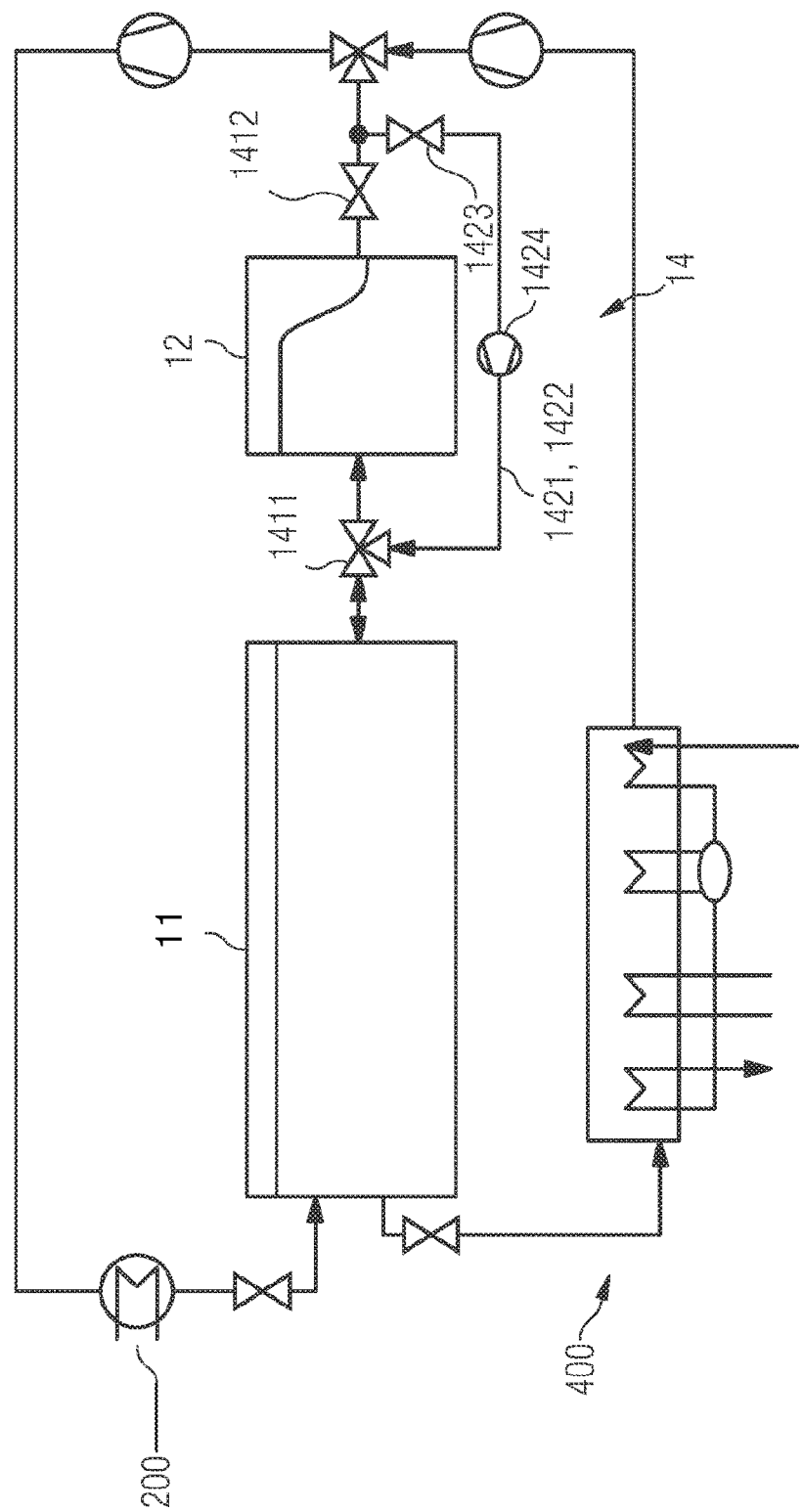
FIG. 12 shows another embodiment of a heat exchange system with small subsidiary heat exchange chamber and big main heat exchange chamber.

After the first discharging process the main heat storage is charged again with the stored heat in the small heat storage at the respective cold end of the main heat storage unit. The stored heat is guided from the small heat storage via the blower to the heating device and then back into the small heat storage, before the transport fluid is guided into the main heat storage for charging purpose, as shown in FIG. 12. When the charging is stopped the temperature gradient is captured in the small heat storage again, as mentioned above.

Figure 13:
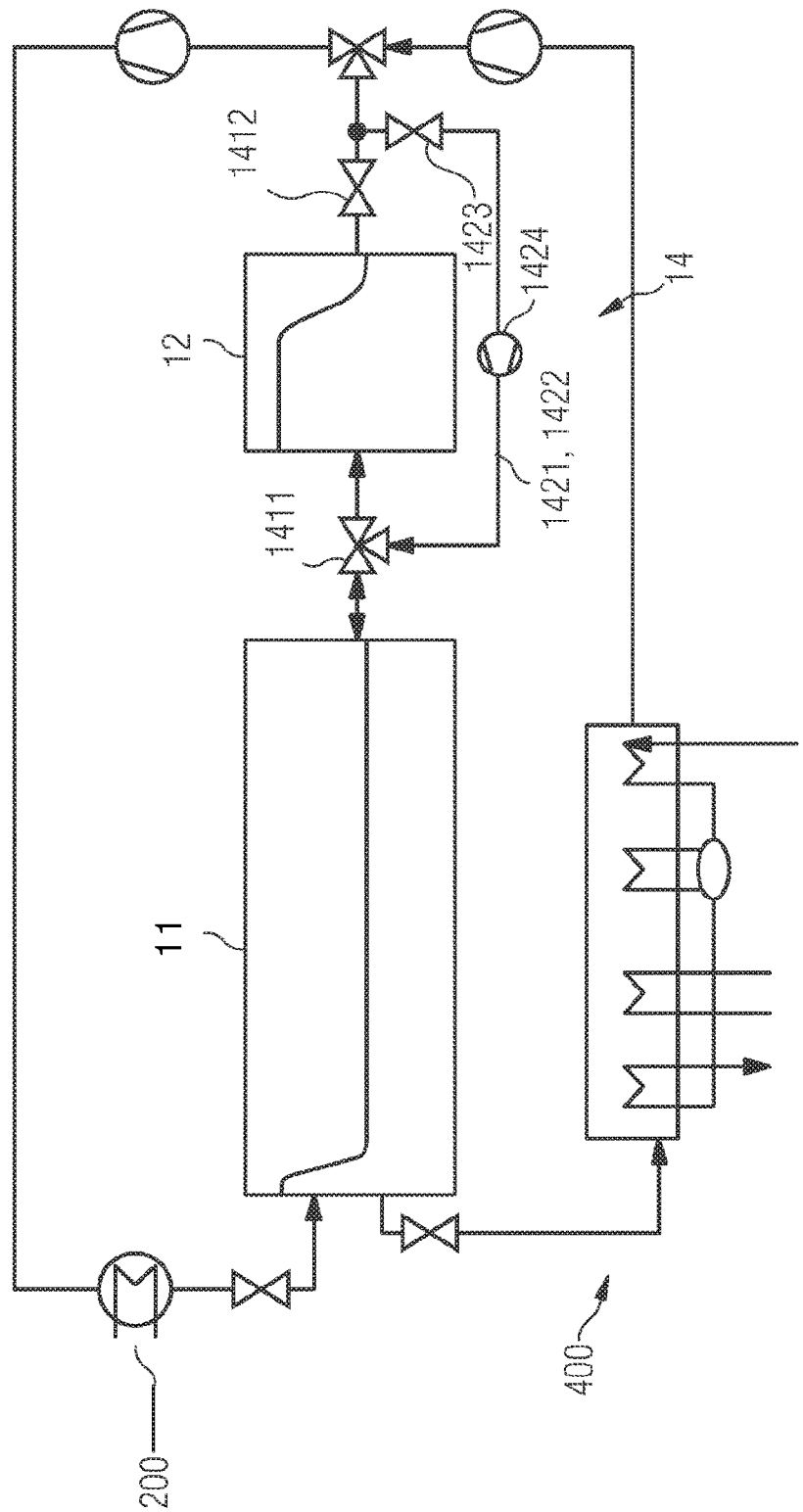
FIG. 13 shows another embodiment of a heat exchange system with small subsidiary heat exchange chamber and big main heat exchange chamber.
Figure 14:
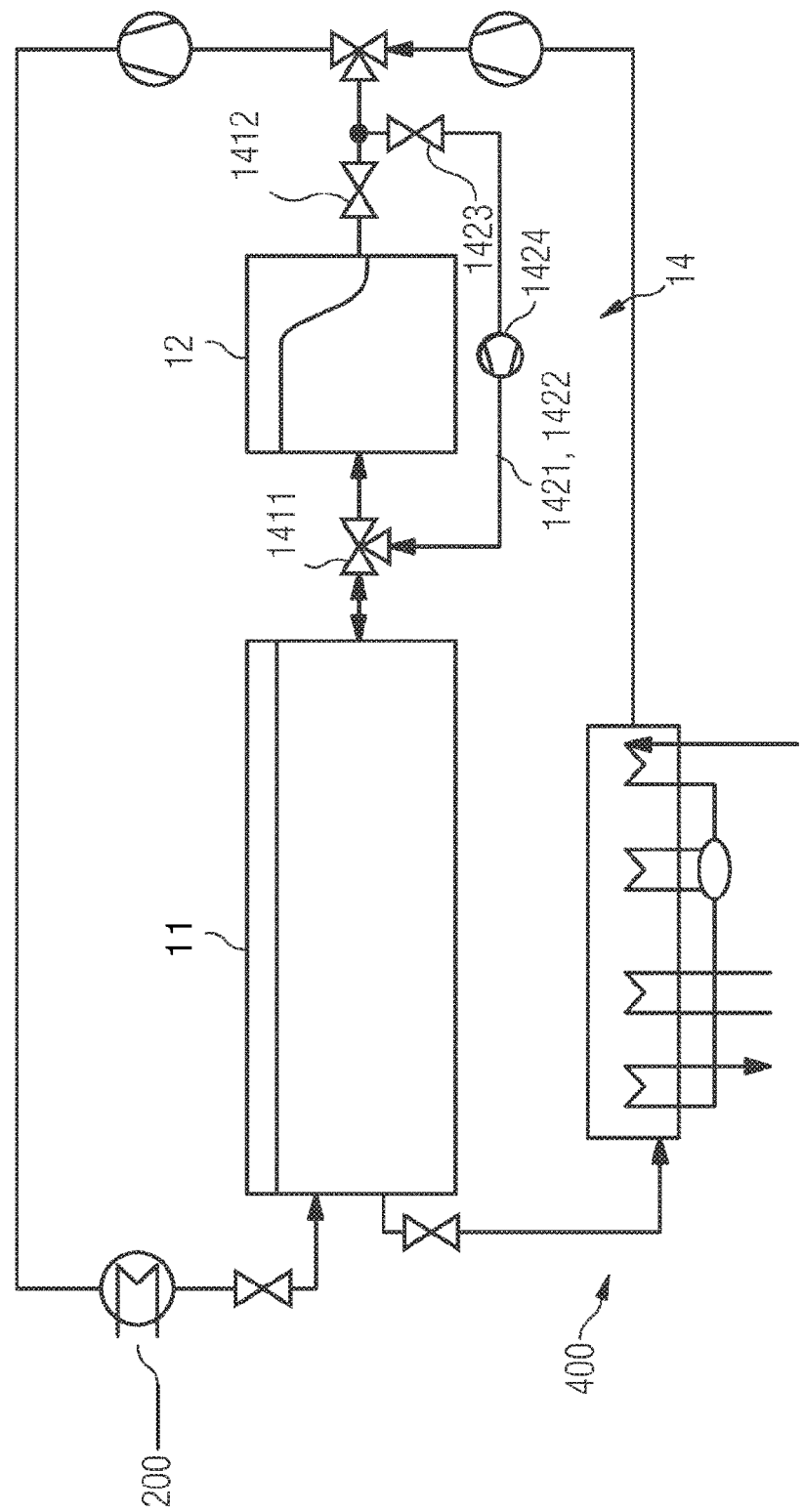
FIG. 14 shows another embodiment of a heat exchange system with small subsidiary heat exchange chamber and big main heat exchange chamber.
Figure 15:
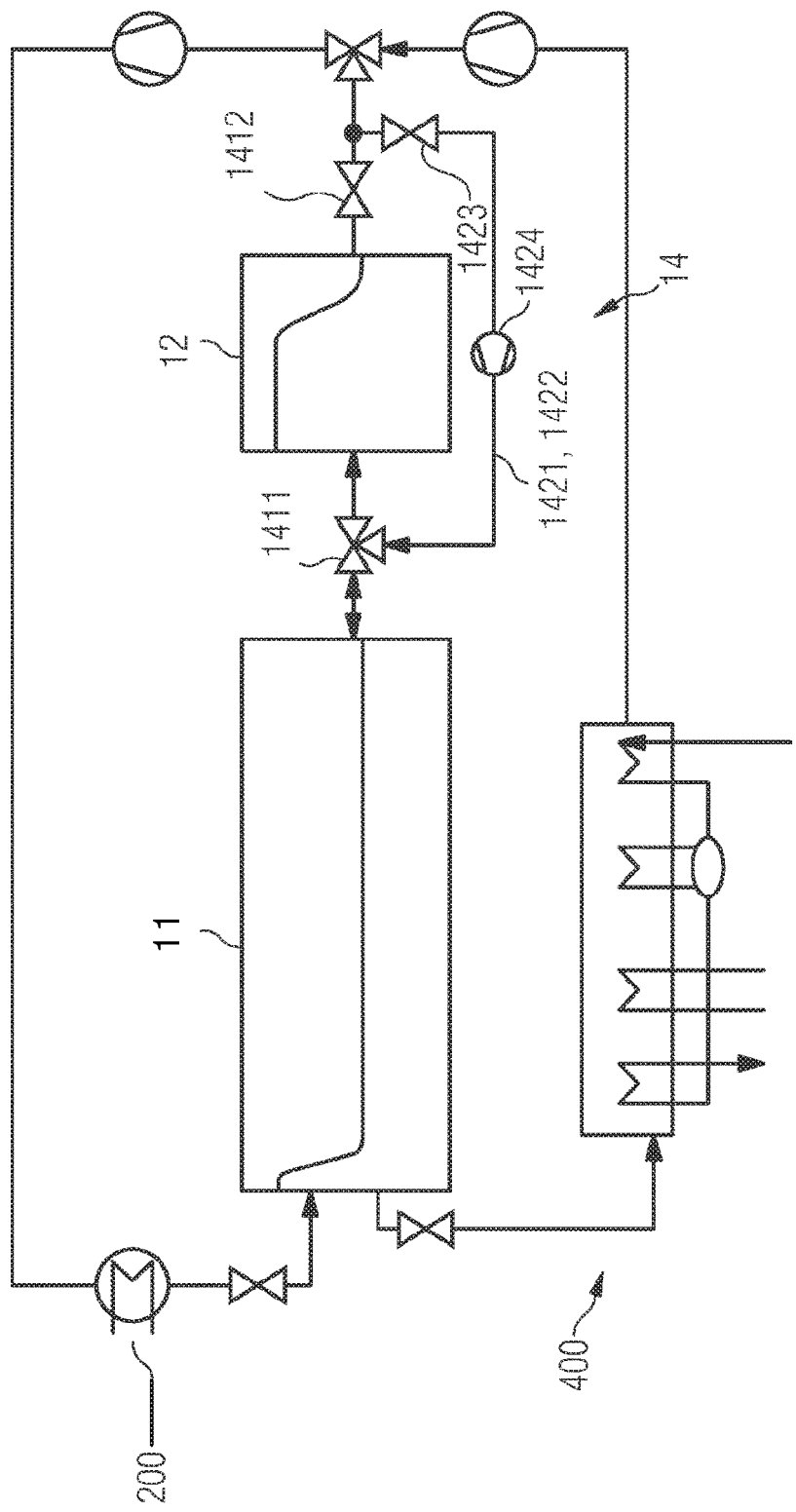
FIG. 15 shows another embodiment of a heat exchange system with small subsidiary heat exchange chamber and big main heat exchange chamber.
Figure 16:
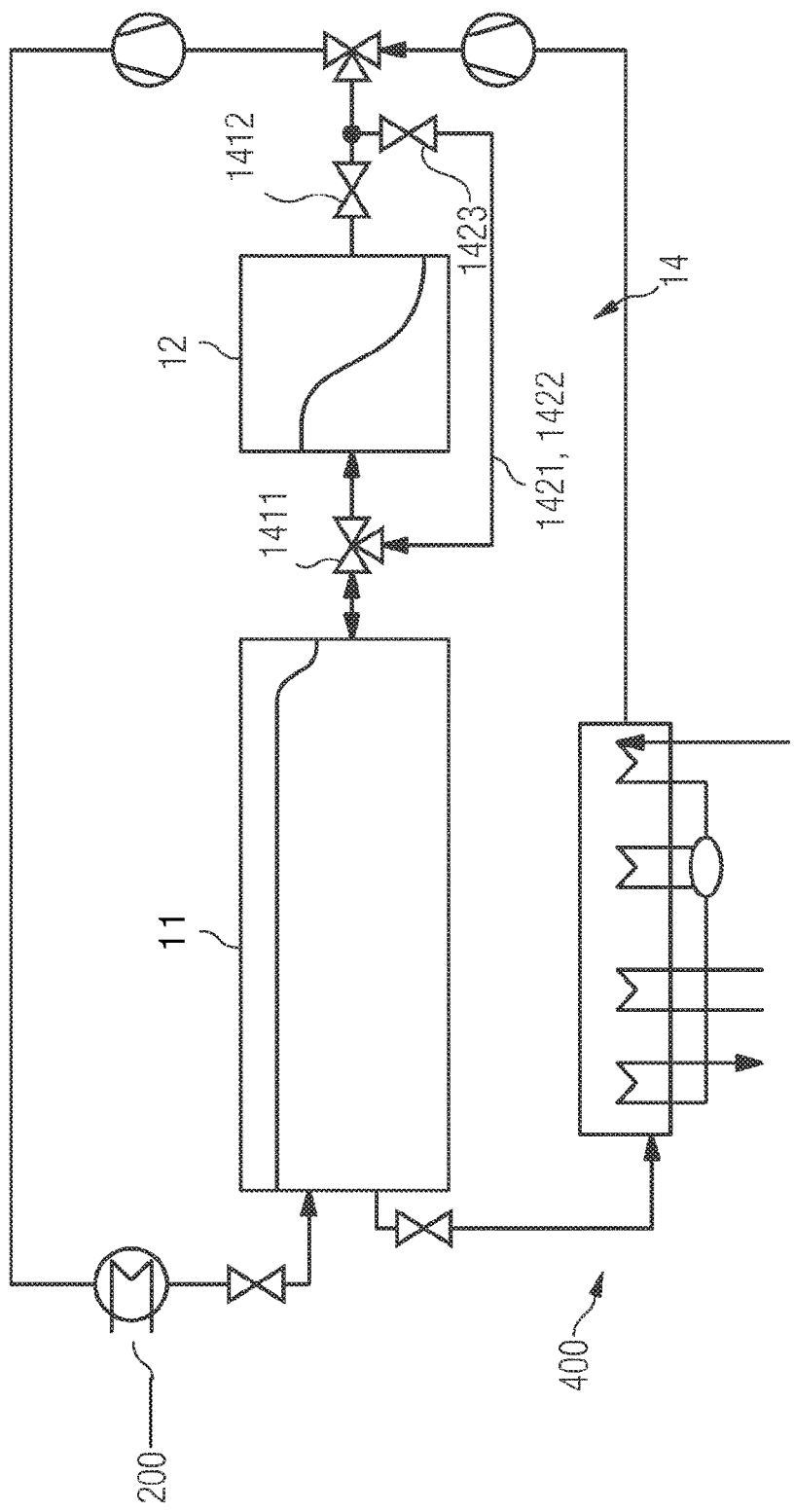
FIG. 16 shows another embodiment of a heat exchange system with small subsidiary heat exchange chamber and big main heat exchange chamber.

The next discharging cycle also involves only the main heat storage for re-electrification purposes. The exhaust heat from the HRSG is redirected in the main heat storage unit for re-storing, as shown in FIG. 13. As described above the valves around the small heat storage are closed, so the heated mass flow is only guided to the respective cold end of the main heat storage unit. The discharging is stopped, when the temperature at the respective hot end of the main heat storage decreases.

The following charging and discharging cycles will have the same states that described above and are shown in FIGS. 14 and 15.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The claims are as follows:

1. A heat exchange system, comprising:
   at least two heat exchange chambers,
   a charging unit for heating the heat transfer fluid within the heat exchange system,
   each of the heat exchange chambers comprises heat exchange chamber boundaries which surround at least one heat exchange chamber interior of the heat exchange chamber, wherein
   the heat exchange chamber boundaries comprise at least one first opening for guiding in of an inflow of at least one heat transfer fluid into the heat exchange chamber interior and at least one second opening for guiding out of an outflow of the heat transfer fluid out of the heat exchange chamber interior;
   at least one heat storage material is arranged in the heat exchange chamber interior such that a heat exchange flow of the heat transfer fluid through the heat exchange chamber interior causes a heat exchange between the heat storage material and the heat transfer fluid; and wherein
   the heat exchange chambers are arranged such that the inflow of the heat transfer fluid into the heat exchange chamber interior of one of the heat exchange chambers comprises the outflow of the heat transfer fluid out of the heat exchange chamber interior of the other heat exchange chamber, and wherein
   the heat exchange chamber interiors of the heat exchange chambers are conjunct together with the aid of at least one conjunction element for guiding of the heat transfer fluid, the a least one conjunction element comprises at least one ducting element and at least one switching element, and wherein
   the switching element comprises at least one first passive fluid control device for adjusting the inflow of the heat transfer fluid into the heat exchange chamber interior of one of the heat exchange chambers and at least one second passive fluid control device for adjusting the outflow of the heat transfer fluid out of the heat exchange chamber interior of the one of the heat exchange chambers; and
   the ducting element comprises at least one bypass pipe for connecting the first passive fluid control device and the second passive fluid control device such that heat transfer fluid can be guided through the bypass pipe from the first passive fluid control device to the second passive fluid control device by bypassing the heat exchange chamber interior of the one of the heat exchange chambers and a bypass flow of the heat transfer fluid through the bypass pipe and the outflow of the one of the heat exchange chambers can be mixed together, wherein during charging the outflow the other of the two heat exchange chambers is split between a first flow guided through the one of the heat exchange chambers, and a second flow guided through the bypass pipe and combining with the first flow after the first flow exits the one of the heat exchange chambers, such that an entry temperature of the combined flow into the charging unit during charging is controllable, wherein the fluid control devices are controlled such that only one of said at least two heat exchange chambers comprises a temperature front during both charge and discharge modes of operation.

2. The heat exchange system according to claim 1, wherein the bypass pipe comprises at least one passive bypass pipe fluid control device and/or at least one active bypass fluid motion device.

3. The heat exchange system of claim 1, wherein the at least one first passive fluid control device is located between the at least two heat exchange chambers such that the heat transfer fluid must pass through the at least one first passive fluid control device after exiting a first of the at least two heat exchange chambers.

4. The heat exchange system of claim 1, wherein the at least one heat storage material is a bulk material.

5. The heat exchange system of claim 1, wherein the fluid control devices are controlled such that a non-uniform temperature profile created by natural convection is reduced.

6. The heat exchange system of claim 1, wherein a first one and a second one of said at least two heat exchange chambers are different in size, and wherein the fluid control devices are controlled such that, for a period of time, only a smaller one of said at least two heat exchange chambers comprises a temperature front during both charge and discharge modes of operation.

7. The heat exchange system of claim 1, wherein a first one and a second one of said at least two heat exchange chambers are different in size, and wherein only a smaller one of said at least two heat exchange chambers includes the bypass pipe, and wherein a larger of one of said at least two heat exchange chambers does not include a bypass.

8. A heat exchange system, with
at least two heat exchange chambers, wherein one of the heat exchange chambers is a main heat exchange chamber of the heat exchange system and one of the heat exchange chambers is a subsidiary heat exchange chamber which is smaller than the main heat exchange chamber and has a lower heat capacity when compared to the main heat exchanger chamber, and further having a charging unit for heating the heat transfer fluid within the heat exchange system;

each of the heat exchange chambers comprises heat exchange chamber boundaries which surround at least one heat exchange chamber interior of the heat exchange chamber, wherein the heat exchange chamber boundaries comprise at least one first opening for guiding in of an inflow of at least one heat transfer fluid into the heat exchange chamber interior and at least one second opening for guiding out of an outflow of the heat transfer fluid out of the heat exchange chamber interior;

at least one heat storage material is arranged in the heat exchange chamber interior such that a heat exchange flow of the heat transfer fluid through the heat exchange chamber interior causes a heat exchange between the heat storage material and the heat transfer fluid; and wherein the heat exchange chambers are arranged such that the inflow of the heat transfer fluid into the heat exchange chamber interior of one of the heat exchange chambers comprises the outflow of the heat transfer fluid out of the heat exchange chamber interior of the other heat exchange chamber, wherein the heat exchange system includes charge/discharge modes of operation having at least one fluid control device, and wherein the at least one fluid controlled device is controlled such that only one of said at least two heat exchange chambers comprises a temperature front during said charge and discharge modes of operation; and wherein during charging the outflow of the main heat exchange chamber is split between a first flow guided through the subsidiary heat exchange chamber, and a second flow guided through an additional gas path and combining with the first flow after the first flow exits the subsidiary heat exchange chamber, such that an entry temperature of the combined flow into the charging unit during charging is controllable.

9. The heat exchange system according to claim 8, wherein the heat exchange chamber interiors of the heat exchange chambers are serially connected together.

10. The heat exchange system according to claim 8, wherein the heat exchange chamber interiors of the heat exchange chambers are conjunct together with the aid of at least one conjunction element for guiding of the heat transfer fluid.

11. The heat exchange system according to claim 10, wherein the conjunction element comprises at least one ducting element and/or at least one switching element.

12. The heat exchange system according to claim 8, wherein the heat storage material comprises sand and/or stones.

13. The heat exchange system according to claim 8, wherein the heat transfer fluid comprises a gas at ambient gas pressure.

14. The heat exchange system according to claim 13, wherein the gas at the ambient pressure is air.

15. A method for exchanging heat by using the heat exchange system of claim 8, wherein the outflow of the heat transfer fluid out of the heat exchange chamber interior of one of the main heat exchange chambers is guided as inflow of the heat transfer fluid into the heat exchange chamber interior of the other subsidiary heat exchange.

16. The method according to claim 15, wherein
the heat exchange chamber interior of one of the heat exchange chambers is bypassed by the heat transfer fluid such that a bypass flow of the heat transfer fluid is generated; and
the outflow out of the heat exchange chamber interior of the one of the heat exchange chambers and the bypass flow are mixed together.

17. The heat exchange system of claim 8, wherein the at least one fluid control device is located between the at least two heat exchange chambers such that the heat transfer fluid must pass through the at least one fluid control device after exiting a first of the at least two heat exchange chambers.

* * * * *